United States Patent [19]

Royer

[11] Patent Number: 4,743,634

[45] Date of Patent: May 10, 1988

[54] MOLDED NON-ASBESTOS FRICTION MEMBER CONTAINING DIATOMACEOUS EARTH

[75] Inventor: James R. Royer, Mount Joy, Pa.

[73] Assignee: Raymark Industries, Inc., Manheim, Pa.

[21] Appl. No.: 821,397

[22] Filed: Jan. 22, 1986

[51] Int. Cl.$^4$ .............................................. C08J 5/14
[52] U.S. Cl. ............................. 523/150; 192/107 M; 428/283
[58] Field of Search ................. 523/150; 428/288, 280, 428/281, 297, 325, 283, 331, 446; 192/107 M

[56] References Cited

U.S. PATENT DOCUMENTS 4,639,392   1/1987   Nels et al. ........................ 428/283

Primary Examiner—James J. Bell
Attorney, Agent, or Firm—Howson & Howson

[57] ABSTRACT

Blister formation in extrusion molded, non-asbestos friction elements such as clutch facings containing substantially non-porous fibers is substantially eliminated by the inclusion in the extrusible plastic mix of which the friction elements are made of a small amount of diatomite having a particle size including agglomerates such that at least 10 percent by weight thereof is maintained on a 325 mesh screen.

12 Claims, No Drawings

MOLDED NON-ASBESTOS FRICTION MEMBER CONTAINING DIATOMACEOUS EARTH

BRIEF DESCRIPTION OF THE INVENTION

This invention relates to improved molded non-asbestos friction members, such as clutch facings, which are substantially free of blisters, and to a novel process for making such friction members.

BACKGROUND OF THE INVENTION

The hazards of airborne asbestos fibers have been well documented, and have necessitated their replacement by other types of fibers in friction elements. Such replacement has been difficult for asbestos fibers are unique minerals combining unusual physical and chemical properties which have made them useful in the manufacture of a wide variety of products. Being of mineral origin, asbestos does not burn or rot, and, depending on variety, possesses extremely high tensile strength as well as resistance to heat. Because of this community of advantageous properties, asbestos fibers have been used extensively by the automotive industry in the manufacture of friction members such as disc brake pads, brake linings and clutch facings.

Asbestos fibers also have an unique hollow tubular structure. In the manufacture of friction elements the reinforcing fibers, particulate friction modifiers and inert fillers are bound together in a heat-curable binder which generally comprises a thermosetting resin, such as a phenol formaldehyde resin, and a heat-curable elastomer, frequently a styrene-butadiene rubber (SBR). During the curing process in which the binder is converted under heat and pressure to the infusible insoluble thermoset state, gases are generated and are vented by periodically opening the molds. By reason of the hollow tubular structure of asbestos fibers, friction elements containing such fibers permitted escape of such gaseous materials and thus there was no problem of forming pockets or "blisters" in the molded elements by entrapped gases. However, the fibers used to replace asbestos are substantially non-porous, and even if somewhat porous, the pores are not interconnected. As a result, in manufacture of friction elements containing such substantially non-porous fibers, gases have been entrapped within the body of the friction elements causing formation of blisters thereby resulting in defective products which could fail in use. Accordingly, such defective products have been treated as rejects. Of course, it is vital to the economic viability of any manufacturing process that the number of rejects be kept to an absolute minimum.

Not only must friction elements be free of defects such as blisters, they must also meet certain industry accepted standards. Major manufacturers of automotive clutch facings require that clutch facings meet a particular performance standard in the hot burst strength test. In this test, the driven member of the clutch, with two facings attached, is heated to 500° F. (260° C.) for 15 minutes and then is subjected to spin testing as a prerequisite to product acceptance. This test is one of the most difficult tests to be passed by a clutch facing since at elevated temperatures fibrous material and the binder comprising resin and/or rubber of which the clutch facing is formed lose strength, resulting in bursts at relatively low rotational speeds. Conventional extruded clutch facings formed of asbestos fibers having an OD of 11 inches (27.94 cm) and ID of 6½ inches (16.51 cm) are known to withstand spin speeds averaging about 7,000 r.p.m. in the hot burst strength test.

It is an object of this invention to provide a novel extrusible asbestos-free composition for forming a friction member, especially a clutch facing, having improved properties.

Another object of this invention is the provision of novel asbestos-free clutch facings which are substantially free of blisters.

Still another object of this invention is to provide a novel, simple and relatively inexpensive method for making asbestos-free clutch facings and other non-asbestos friction members which are substantially free of blisters.

These and other objects of this invention will become further apparent from the following detailed description of the invention. Although such description relates specifically to the fabrication of clutch facings, it will be recognized by those skilled in the art that the compositions and methods can be used to make other types of friction members.

DETAILED DESCRIPTION OF THE INVENTION

This invention provides novel asbestos-free clutch facings of annular configuration comprising a blend of fibers, including refractory fibers, of relatively short length, friction modifiers and inert fillers, including diatomaceous earth, the function of which is described in greater detail hereinafter, and a binder comprising an elastomer and a thermosetting resin. In addition to refractory fibers, the fiber blend includes glass fibers, natural organic fibers and synthetic organic fibers, each in specified proportions.

It was discovered that the inclusion of a small amount of diatomite or diatomaceous earth is an inert filler in the plastic mixture containing substantially non-porous fibrous material from wnich the friction elements are fabricated substantially reduces the tendency for gas to be entrapped in the mixture during curing of the binder. Diatomite is a siliceous, sedimentary rock composed of the skeletal remains of single celled aquatic plants called diatoms. Up to 85 percent of the fossil skeletons is comprised of interconnected pores or voids. When diatomaceous earth is present in friction materials having substantially non-porous fibers the pores of such filler permit escape of gases formed in curing the binder under heat and pressure and thereby prevent formation of pockets or blisters in the resulting friction elements, which blisters reduce the strength and otherwise adversely affect the physical properties of the friction elements.

The novel asbestos-free clutch facings may be prepared by forming a substantially homogeneous, extrusible wet plastic mixture having the composition set forth in Table I, below, extruding a tape from such mixture, cutting the tape into preforms of the desired shape and size, substantially reducing the solvent content of the preforms, subjecting the preforms to heat and pressure to densify the preforms and partially cure the binder, and baking the densified preforms to complete the cure of the binder. The resulting clutch facings are then subjected to the usual grinding and drilling operations.

TABLE I

| Constituent | Weight Percent | |
| --- | --- | --- |
| | General | Preferred |
| Fibrous material | 56 to 5 | 35 to 23 |
| Friction modifiers and fillers, including diatomaceous earth | 4 to 60 | 25 to 50 |
| Binder (including curatives) | 40 to 20 | 38 to 24 |

In addition the composition should contain sufficient organic solvent for the binder system to provide a wet plastic mixture which can be readily extruded to form a tape from which the clutch facing preforms are cut. In Table I and in the appended claims, the percentages are by weight on a solvent-free basis, unless otherwise indicated.

The fibrous material comprises a blend of relatively short fibers which are present in specific proportions. The proportions of the respective fibers and their lengths are given in Table II, below:

TABLE II

| Fiber Type | Weight Percent | | Average Length (in.) | |
| --- | --- | --- | --- | --- |
| | General | Preferred | General | Preferred |
| Glass | 79 to 1 | 55 to 30 | 1/16 to 3 | ½ to 1½ |
| Natural organic | 1 to 50 | 15 to 39 | ≦2 | ⅛ to 2 |
| Synthetic organic | 19 to 0 | 15 to 1 | ≦2 | ¼ to 2 |
| Refractory | 1 to 49 | 15 to 30 | ≦2 | ⅛ to ½ |

In Table II and in the claims the percentages recited are by weight based on the total weight of the dry fiber blend.

The glass fibers preferably comprise a blend of two different fiber lengths, namely, fibers having a length of from about 1 to 3 inches (2.54 to 7.62 cm), preferably about 1½ inches (3.81 cm), and those of very short average length less than about ½ inch (1.27 cm), preferably about ⅛ inch (0.317 cm). The larger of the glass fibers enhance the burst strength of the clutch facings, while the shorter glass fibers assist in filling in the voids between the longer fibers to provide the clutch facings with the desired density. Both types of fibers contribute to the wear resistance of the clutch facings. Preferably the fibers are of the low sodium type used in making fiberglass reinforced plastics.

It is desirable that the glass fibers first be treated in such manner as to enhance their ability to form a strong and permanent bond with the heat-hardenable binder. This can be accomplished by application of an anchoring agent to the fibers.

A suitable anchoring agent is represented by the amino silanes such as gamma-aminopropyltriethoxy silane or by a similar silane having a carboxyl group in the organic group attached to the silicon atom or an amino or carboxyl group in the carboxylato group of a coordination compound. These may be applied to the glass fiber surfaces or incorporated as a component of a size composition. The use of such silanes as anchoring agents is disclosed in U.S. Pat. No. 3,287,204 issued Nov. 22, 1966.

Another treatment to obtain enhanced bonding of the binder to glass fibers involves the application thereto of an aqueous solution of magnesium chloride, zinc chloride, or magnesium hydroxide or zinc hydroxide. After application is made in the form of the chloride, the solution in aqueous medium may be adjusted to an alkaline pH to effect deposition on the glass filaments in the form of the hydroxide. The hydroxides are then converted to the corresponding oxides by heat treatment. This method is described in U.S. Pat. No. 3,311,528 issued Mar. 28, 1967.

The glass fibers may also be rendered receptive to forming a strong bond with the binder by treating the glass fibers with a size having as an essential ingredient, the reaction product of an imidazoline having a long chain fatty acid group containing at least 5 carbon atoms and an unsaturated polyester resin formed in an uncured state as disclosed in U.S. Pat. No. 3,097,963 issued July 16, 1963.

Other suitable procedures for rendering glass fibers receptive to forming a strong bond with the binder involve the use of a chromic coordination compound having a carboxylate group coordinated with a trivalent nuclear chromium atom in which the carboxylate group is of less than 6 carbon atoms and contains a highly functional group (U.S. Pat. No. 3,552,910), the use of a silane, its hydrolysis products or its polymerization products having at least one of the organic groups attached to the silicon atom containing less than 7 carbon atoms and having been formed with ethylenic unsaturation (U.S. Pat. No. 2,562,288), the use of a silane-organic polymeric compound having film forming properties (U.S. Pat. No. 3,169,884), and the use of a size consisting of an organic silicon compound in the form of a silane, a water dispersible polyvinyl pyrrolidine, gelatine, and a water dispersible polyester resin (U.S. Pat. No. 3,207,623).

This invention is not limited to any specific treatment of the glass fibers provided the treatment provides the glass fiber surfaces with the ability to form a strong bond with heat-hardenable binder.

The natural organic fibers used in the practice of the invention include cotton, jute, hemp, sisal, wool and the like, cotton fibers being particularly preferred. Depending upon the length, they should be chopped up so that the length thereof is in the range of from about ⅛ to about 2 inches (0.318 to 5.08 cm), cotton fibers having an average length of about ¼ inches being perferred.

In the fiber blend there are also included synthetic organic fibers, examples of which are polyacrylonitrile (PAN), modacrylic, aramid, nylon, acrylic and polyester fibers. PAN fibers are preferred and are composed of at least 85 percent of a homopolymer of acrylonitrile, and their length should not exceed about 2 inches (5.08 cm), fibers with an average length of approximately ¼ inch (0.635 cm) being preferred.

The proportions of natural organic fibers and synthetic organic fibers in the fiber blend should be as set forth in Table II, above. In such proportions the relatively small natural organic fibers and synthetic organic fibers, like the smaller glass fibers, fill in the small voids between the larger fibers thereby aiding in densifying the clutch facings. In addition, during curing of the clutch facing preforms and especially during subsequent use of the finished clutch facings, the natural organic fibers and synthetic organic fibers, especially those on the working surface, are at least partially converted into more heat-resistant carbon fibers. Since both types of fibers are substantially uniformly distributed throughout the thickness of the facing, the carbonizing process may continue throughout the useful working life of the clutch facings.

Also important is the inclusion in the fibrous material of refactory fibers. As used in this specification and appended claims the term "refactory fibers" is given its usual and art recognized meaning. See Kirk-Othmer, *Encycl. of Chem. Tech.* 3d. Vol. 20, pp 65–77 (1982), incorporated herein by reference. Thus, the term defines a wide range of amorphous and polycrystilline synthetic fibers which can be used at temperatures generally above 1093° C. Chemically, these fibers can be separated into oxide and nonoxide fibers. The former include alumina-silica fibers and chemical modifications of the alumina-silica system, high silica fibers (>99% $SiO_2$), and polycrystalline zirconia, and alumina fibers. The diameters of oxide fibers are 0.5–10 $\mu$m (av. ca 2 $\mu$m). The length, as manufactured ranges from less than 1 cm to continuous filaments.

The nonoxide fibers, namely, silicon carbide, silcon nitride, boron nitride, carbon, and graphite have diameters of about 0.5–40 $\mu$m. Generally nonoxide fibers, as manufactured, are much shorter than oxide fibers except for carbon, graphite and boron fibers, which are manufactured as continuous filaments.

As shown in Table II, the refractory fibers comprise from about 1 to 49 percent, preferably about 15 to 30 percent of the fiber blend, and have a length not exceeding about 2 inches, preferably about $\frac{1}{8}$ to $\frac{1}{2}$ inches.

The refractory fibers contribute to the burst strength, improved wear and thermal stability of the clutch facings.

In addition to fibrous material and heat-curable binder, the composition of which the clutch facings of the invention are made contains particulate friction modifiers and fillers. The former term as used in the automotive friction materials industry includes particulate organic and inorganic materials that are included to enhance, reduce, or modify the frictional characteristics of the friction material. Suitable friction modifiers include, for example, graphite, metal oxides, such as magnesium oxide and alumina, barytes, aluminum silicate, polymerized cashew nut oil particles, cryolite, metallic particles, such as brass chips, and the like. Examples of inert fillers are carbon black, ground cured rubber particles, ground organic resins, clay, silica and diatomite. As noted above, the last named filler is an essential constituent and considerably improves the processability of the friction composition to substantially eliminate blisters. The friction modifiers and inert fillers combined may comprise on the order of 4 to 60 percent, on a solvent free basis, of the composition from which the clutch facings are made. Preferably the extrusible composition will comprise from about 25 to about 50 percent of such particles.

Referring specifically to the diatomite, also known as diatomaceous earth and kieselguhr, chemically it consists primarily of silicon dioxide and is essentially inert (see Kirk-Othmer *Encycl. Chem. Tech.* 3d. Vol. 7, pp 603–614 (1979), incorporated herein by reference). The ultimate particles are characterized by very irregular shapes, a generally spiny structure and pitted surface condition. They average only 5 to 20 microns in diameter, but have a surface area several times greater than any other mineral with the same particle size. As noted previously, up to 85 percent of the volume of diatomite is made up of tiny interconnected pores or voids. This porosity makes diatomite uniquely suited for inclusion in the plastic mixture of this invention used in fabrication of clutch facings for the presence of such pores enables gases generated during curing of the binder to escape thereby avoiding the formation of unwanted blisters.

The diatomite used in the present invention contains a substantial percentage of agglomerates of individual particles whereby at least 10 percent, by weight of the diatomite is retained on a 325 mesh screen (U.S. Standard). Nevertheless, such agglomerates have sufficient porosity to permit escape of gases to prevent blister formation. Diatomite products useful in the present invention are sold by Johns-Manville Corp. under the tradename Celite 110 and 319.

The diatomite should comprise from about 1 to about 20 percent, preferably 1 to 5 percent, by weight, based on the total dry weight of the friction composition, in order to provide adequate porosity.

Lastly, the moldable composition contains a binder which may comprise a thermosetting resin, a heat-curable elastomer, or combination thereof. Suitable thermosetting resins for use in the binder include phenol formaldehyde, resorcinol formaldehyde, phenol cresol formaldehyde, phenol furfural, epoxy, epoxidized phenolic, melamine formaldehyde resin, and the like. The preferred thermosetting resin is phenol formaldehyde.

Suitable heat-curable elastomers for use in the binder include natural rubber, and such synthetic rubbers as styrene-butadiene (SBR), polychloroprene and mixtures of such rubbers. A preferred elastomer is SBR rubber. Also, the binder preferably comprises from about 35 to about 50 percent thermosetting resin and from about 50 to about 65 percent rubber, said percentages being by weight, based on the total weight of resin and rubber.

The heat-curable binder also contains the usual curing agents for the rubber, such as sulfur, and for the resin, and may also contain accelerators to reduce curing time. The amount of binder used including curing agents, accelerators, etc. is as set forth in Table I, above.

In order to provide the friction composition in the form of a wet plastic mix which is extrusible, there is included therein one or more organic solvents for the resin and rubber. Typical of the rubber solvents are hydrocarbons such as hexane, petroleum naphthas and toluene, while lower aliphatic alcohols such as isopropyl alcohol are excellent solvents for thermosetting resins. A combination of rubber and resin solvents is particularly preferred.

The total amount of solvent present in the wet plastic mix should be such as to permit the mix to be extruded in the form of a tape which may be as much as 10 inches (24.5 cm) or more in width and $\frac{1}{8}$ to $\frac{1}{2}$ inch (0.318 to 1.27 cm) in thickness. Generally a mix which can be satisfactorily extruded as such a tape, as for example by a screw-type extruder, will contain on the order of about 15 to about 25 percent total solvent, based on the total weight of the dry ingredients, i.e. fibrous material, friction modifiers and fillers, and binder constituents. A particularly useful mix having desirable extrusion properties may contain on the order of about 20 percent solvent.

In preparing the extrusible composition, it is generally desirable to dissolve the heat-curable elastomer or rubber in an organic solvent as for example in a sigma blade mixer equipped with a water jacket through which cooling water is circulated to remove heat generated by friction and thereby minimize evaporation of solvent during the entire mixing process.

A solution of the thermosetting resin in organic solvent is also prepared and added to the rubber solution, following which a portion of the remaining dry ingredients is added with mixing. Additional solvent may then be added after which the remaining dry ingredients are introduced to the mixer and mixing, with appropriate cooling, is continued until a substantially homogeneous wet plastic mix is obtained. A total mixing time of from about 1 to 2 hours ordinarily will result in a mix having the desired homogeneity.

As indicated above, the wet plastic mix is placed in a suitable extruder, such as screw-type extruder, from which it is extruded as a tape of the desired width and thickness. The tape is then cut into preforms of the desired dimensions. In the case of clutch facings, the preforms are annular in configuration, and can be stamped out with a suitable cutter, with scrap material being returned to the extruder.

The ring-shaped preforms are treated so as to reduce the solvent content to less than about 5 percent. An effective and economic procedure of reducing the solvent content of the preforms is to store them at room temperature for about 12 hours to effect a partial evaporation of solvent, followed by placing them in an air circulating drying oven maintained at about 200° F. (93° C.) where they remain for about a similar period of time.

The preforms of reduced solvent content are then placed in molds of a hydraulic press where they are consolidated and densified under a pressure of about 3500 to 4000 psi while being maintained at a temperature of about 350° to 400° F. (177° to 204° C.). The molded preforms are removed from the press molds and placed in an oven where they are slowly heated to a temperature of about 450° F. (232° C.) over a period of several hours (4 hours at 400° F. plus 1½ hours at 450° F.) to complete cure of the binder.

Each molded clutch facing or other article is then machined to the desired dimensions and holes are drilled therein for receiving rivets for mounting the articles.

The following examples will illustrate the invention, and are not to be construed as limiting the scope of the invention for there are numerous possible variations and modifications.

EXAMPLE I

A clutch facing was prepared using the ingredients listed in Table III in the amounts stated:

TABLE III

| Ingredient | Parts by Weight |
|---|---|
| Glass fibers (1½" ave. length) (3.81 cm) | 0.85 |
| Glass fibers (⅛" ave. length) (.317 cm) | 11.12 |
| Cotton fibers (¼" ave. length) (.635 cm) | 9.15 |
| PAN fibers (¼" ave. length) (.635 cm) | 1.80 |
| Refractory fibers (⅛" ave. length)* (.317 cm) | 6.50 |
| Phenol formaldehyde resin | 11.38 |
| SBR rubber (crumb) | 15.39 |
| Diatomaceous Earth (Celite 110) | 1.37 |
| Friction modifiers & Inert fillers | 35.14 |
| Curatives (Sulfur & Accelerator) | 7.30 |
| Total Dry Weight | 100.00 |

*Alumina/silicate

THE SBR rubber, together with curing agents and accelerators, was dissolved in a mixture of 74 parts hexane and 98 parts of a petroleum naphtha, the solvation being carried out in a sigma bladed mixer equipped with a water jacket through which cooling water was circulated. Approximately one-half of the total amount of fibrous material and friction modifiers was added to the mixer and mixing was continued for about 30 minutes, which was followed by addition of the remainder of the fibrous material and friction modifiers. The phenolic resin was separately dissolved in equal parts by weight of isopropyl alcohol and the resulting resin solution was combined with the rubber solution in the mixer.

The wet plastic mix was immediately transferred to the hopper of a screw-extruder to avoid loss of solvent, and a tape of said mix about 11¾ inches (29.8 cm) wide and ⅜ inch thick was extruded. Annular preforms of the desired OD and ID dimentions were stamped out of the tape, and scrap material was returned to the extruder hopper.

The preforms were stored over night at room temperature and then placed in an air circulating drying oven maintained at 200° F. (93° C.) where they remained for approximately 12 hours. By means of this procedure the solvent content of the preforms was reduced to less than about 4 percent, based on the total weight of fibrous material, friction modifiers and binder.

The dried preforms were placed in molds heated to 375° F. (190° C.) where they were subjected to a pressure of 3800 psi for a period of 2 minutes. The densified preforms were removed from the molds and placed in an oven where they were gradually heated to 450° F. (232° C.) over a 5 hour period.

A large number of clutch facings so made were ground to the following dimensions: OD 11 inches (27.94 cm), ID 6½ inches (16.15 cm), thickness 0.135 inches (0.343 cm), and the ground facings were drilled to provide holes for attaching them to a metal support.

Of the many clutch facings produced according to this Example I, only 1.6 percent thereof were rejected because of blisters. Surprisingly, such result was obtained by the inclusion of only approximately 1.37 percent of diatomite, whereas the number of rejects of clutch facings produced from a substantially identical friction composition not containing diatomite was an economically unacceptable 12 percent.

EXAMPLE II

Several clutch facings prepared according to Example I were tested for hot burst strength according to the following procedure:

Each clutch facing was riveted to a drive member, and the mounted facing was heated for 15 minutes in an oven maintained at 500° F. (260° C.). The mounted clutch facing was removed from the oven and attached to the rotatable shaft of a centrifugal burst machine. The test was immediately begun and the driven member to which the clutch facing was mounted reached 3500 rpm in approximately 2 seconds. Thereafter the speed of the driven member was increased at an average rate of approximately 220 rpm/sec. Test results were recorded in terms of the speed of rotation at the time the clutch facings burst.

The average burst strength for the clutch facings of Example I when so tested was 7530 rpm, an 8 percent increase over commercially available extruded molded asbestos clutch facings of the same dimensions.

EXAMPLE III

Clutch facings of Example I were subjected to the following test: Two clutch facings were riveted to a driven member. The mounted clutch facings were then installed on a fixed shaft of a dynamometer between a standard automotive flywheel and pressure plate. The fly wheel and pressure plate were then rotated with respect to the fixed clutch facing assembly at 1100 rpm. Provisions were made to apply pressure from the pressure plate to generate a torque as a result of the friction of the clutch facing. Every minute, one 4 second application of the pressure plate onto the clutch facing was made at a controlled torque level of 310 lbs.-ft. (420 N-M).

For the complete test, 1200 of such applications were made. The clutch facing was measured before and after testing and the wear of the facing was calculated from the difference between the measurements. The average wear of the two facings so tested was 0.028 inches (0.071 cm), on average of 0.014 inch per facing. The severity of this test decomposes the conventional commercially available extruded molded clutch facings to a point where they no longer hold torque. Total wear of extruded molded asbestos facings is in excess of 0.060 inches.

EXAMPLE IV

Clutch facings prepared according to Example I were subjected to a Controlled Torque test using a Long Clutch Dynamometer as described below.

The thickness of the facings was measured at ten different places at the OD and ID, and then the facings were tested for friction properties using the following procedure.

1. The clutch is applied for 4 seconds at 1100 rpm and a constant torque of 235 lb. ft. (318 N-M) in each application. The clutch output torque is controlled by limiting the engagement of the clutch through means of the adjustment in the releasing mechanism. Adjustment can be made to achieve only an average value of output torque during the 4 second engagement.

2. The slutch is released for 56 seconds followed by reapplication.

3. After 100 applications, a 15 second hot fade test at full pressure is made.

4. Without cooling, the pressure is adjusted immediately to a controlled torque of 235 ft. lbs., and additional applications are made.

5. Another 15 second hot fade test at full pressure is made, followed by an additional 100 applications at controlled torque without cooling.

TABLE IV

| Fade No. | Coefficient of Friction | |
|---|---|---|
| | Maximum | Minimum |
| 1 | .42 | .22 |
| 2 | .42 | .22 |
| 3 | .42 | .24 |

The thickness of the test clutch facing was remeasured following the test and wear was found to be only 0.009 inches (0.023 cm).

I claim:

1. In an extrusible, asbestos-free composition for forming a friction member for use in a substantially dry environment comprising a substantially homogeneous wet plastic mixture comprising substantially non-porous fibrous material, friction modifiers and inert fillers, heat-hardenable binder and an organic solvent in an amount to enable the plastic mixture to be extrusible, the improvement which comprises including in said plastic mixture diatomaceous earth having a particle size including agglomerates such that at least 10 percent by weight thereof, is retained on a 325 mesh screen, the amount of diatomaceous earth present being sufficient to permit gases generated during curing of the binder to escape from said mixture to provide a substantially blister-free friction element.

2. A plastic mixture according to claim 1 in which said diatomaceous earth comprises from about 1 to about 20 percent by weight, based on the total weight of dry constituents in said mixture.

3. A plastic mixture according to claims 2 comprising from about 1 to about 5 percent diatomaceous earth.

4. A plastic mixture according to claims 1, 2 or 3 in which said fibrous material comprises from about 79 to about 1 percent of glass fibers having a length of from about 1/16 to about 3 inches (0.156 to 7.62 cm.), from about 1 to about 50 percent natural organic fibers having a length not exceeding about 2 inches (5.08 cm.), from about 19 to about 0 percent synthetic organic fibers having a length not exceeding about 2 inches (5.08 cm.), and from about 1 to about 49 percent refractory fibers having a length not exceeding about 2 inches (5.08 cm.), said percentages being by weight based on total weight of fibrous material.

5. A plastic mixture according to claims 1, 2 or 3 in which said fibrous material comprises from about 55 to about 30 percent of glass fibers having a length of from about ⅛ to about 1½ inches (0.318 to 3.81 cm.), from about 15 to about 39 percent natural organic fibers having a length of from about 1/8 to about 2 inches (0.318 to 5.08 cm.), from about 15 to about 1 percent synthetic organic fibers having a length of from about ¼ to about 2 inches (0.635 to 5.08 cm.), and from about 15 to about 30 percent refractory fibers having a length of from about ⅛ to about ½ inches (0.318 to 1.28 cm.), said percentages being by weight based on total weight of fibrous material.

6. In a non-asbestos friction element for use in a substantially dry environment comprising a substantially homogeneous mixture comprising substantially non-porous fibrous material, friction modifiers and inert fillers, and heat hardenable binder, said friction element having been subjected to heat and pressure to consolidate said mixture and cure said binder, the improvement which comprises including in said mixture diatomaceous earth having a particle size including agglomerates such that at least 10 percent by weight thereof is retained on a 325 mesh screen, the amount of diatomaceous earth present being sufficient to permit gas generated during curing of said binder to escape from said mixture whereby said friction element is substantially blister-free.

7. A non-asbestos friction element according to claim 6 in which said diatomaceous earth comprises from about 1 to about 20 percent by weight, based on the total weight of dry constituents in said mixture.

8. A non-asbestos friction element according to claim 7 comprising from about 1 to about 5 percent diatomaceous earth.

9. A friction element according to claims 6, 7 or 8 in which said fibrous material comprises from about 79 to about 1 percent of glass fibers having a length of from about 1/16 to about 3 inches (0.156 to 7.62 cm.), from about 1 to about 50 percent natural organic fibers having a length not exceeding about 2 inches (5.08 cm.), from about 19 to about 0 percent synthetic organic fibers having a length not exceeding about 2 inches (5.08 cm.), and from about 1 to about 49 percent refractory fibers having a length not exceeding about 2 inches (5.08 cm.), said percentages being by weight based on total weight of fibrous material.

10. A friction element according to claims 6, 7 or 8 in which said fibrous material comprises from about 55 to about 30 percent of glass fibers having a length of from about ⅛ to about 1½ inches (0.318 to 3.81 cm.), from about 15 to about 39 percent natural organic fibers having a length of from about ⅛ to about 2 inches (0.318 to 3.81 cm.), from about 15 to about 1 percent synthetic organic fibers having a length of from about ¼ to about 2 inches (0.635 to 5.08 cm.), and from about 15 to about 30 percent refractory fibers having a length of from about ⅛ to about ½ inches (0.318 to 1.27 cm.), said percentages being by weight based on total weight of fibrous material.

11. A friction element according to claim 6 in the form of a clutch facing.

12. A friction element according to claim 10 in the form of a clutch facing.

* * * * *